United States Patent Office 3,714,017
Patented Jan. 30, 1973

3,714,017
ELECTRODE DEVICE FOR ELECTROCHEMICALLY FORMING THE PLATES OF TURBINE ROTORS
Gustav Stark, Klaus Otto, and Rolf Geissler, Nurenberg, Germany, assignors to Siemens Aktiengesellschaft, Berlin and Munich, Germany
Original application Oct. 12, 1967, Ser. No. 674,896, now Patent No. 3,523,876, dated Aug. 11, 1970. Divided and this application Nov. 21, 1969, Ser. No. 878,626
Int. Cl. B23p 1/00
U.S. Cl. 204—284                                    4 Claims

ABSTRACT OF THE DISCLOSURE

An electrode device for electrolytically forming the blades of multi-stage turbine rotors as integral portions of the rotor body comprises a tubular, inwardly and outwardly insulated shank and a generally annular electrode foot mounted on the shank and having an inner contour in accordance with the profile of a turbine blade to be formed. The outer contour of the electrode foot is made wider than corresponds to the arcuate blade division of the rotor to be produced so that the electrolytical operations for forming each two adjacent turbine blades overlap between the two blades. The working face of the electrode foot is curved cylindrically in accordance with the blade-foot circle of the rotor to be produced. The inner edge of the annular electrode foot is rounded in accordance with the rounding desired at each blade foot where the blade meets the foot circle. The tool electrode affords the complete removal of workpiece material from between the resulting blades and also produces an undistorted cylindrical area along the foot circle between adjacent blades.

---

This is a division of application Ser. No. 674,896, filed Oct. 12, 1967, now Pat. No. 3,523,876.

Our invention relates to the electrochemical forming of metallic workpieces with the aid of a tool electrode which during operation is gradually advanced relative to the workpiece while an electrolyte, usually an aqueous solution, is forced through the narrow working gap between the electrode and the workpiece. With the tool electrode connected anodically and the workpiece cathodically, the electrolyte dissolves material from the workpiece so that the workpiece is electrochemically "machined" in accordance with the contour of the electrode.

In a more particular aspect, our invention relates to an electrochemical tool electrode particularly suitable for producing multi-stage turbine rotors by forming the rotor blades out of the rotor material. Such blade-forming tool electrodes comprise a metallic electrode shank of tubular shape which is insulated on the inner and outer surfaces and to which is attached a metallic electrode foot of generally annular shape whose inner contour corresponds to the profile of the rotor blades to be electrolytically produced.

The method and a device for forming metallic workpieces by electro-erosion generally of the type mentioned in the foregoing is known from the German published patent application 1,237,713. The tool electrode described therein forms a working gap with the workpiece, and an electrolyte is pumped under pressure through the gap while electric current is passed from the workpiece through the gap to the tool electrode. The electric current field thus maintained in the gap causes material to be removed from the workpiece while the electrode and the workpiece are moved relative to each other. The device for performing this method comprises means for displacing the electrode and the workpiece relative to each other at a feeding speed substantially equal to the rate of removal of material from the workpiece. The front surface of the electrode thus employed is slightly wider than the electrode shank, and the electrode surface areas not intended to participate in the erosion work are covered by insulation.

It is further known to produce individual turbine-blade wheels electrochemically by sinking a hollow or tubular electrode radially into a circular disc so that the space between adjacent blades is completely cleared of material by the electrochemical action.

Also known is the production of individual turbine blades by sinking a blade-forming electrode into a properly shaped workpiece. The individual blades are given such a design of the blade feet that they can be subsequently joined together to thus obtain a composite blade wheel.

It is an object of our invention to afford the production of plural stage turbine rotors, i.e. turbine rotors having several blade rings, by shaping the blades electrochemically from a prepared massive block, namely by radially sinking a blade-forming electrode into the workpiece to form one blade, and then repeating this process as many times as is needed for producing all of the blades.

If one attempted to employ for such purpose a blade-forming electrode of the known design, a wedge-shaped piece of material would remain between each two adjacent blades, and the merging area between one blade foot and the next would have a stepped configuration. The residual wedge of material would have to be subsequently removed by mechanical machining. Such an additional operation is difficult to perform and, with a very dense blade sequence, hardly applicable in practice.

It is therefore another, more specific object of our invention to devise an electrochemical electrode device which obviates the above-mentioned difficulties and affords producing turbine rotors, particularly multi-stage rotors, that do not require further machining for the purpose of removing residual material from between adjacent blades and also secures a smooth cylindrical rotor contour between the blades.

To achieve these objects and in accordance with our invention, we provide a generally tubular metallic electrode shank, insulated on its internal and external surfaces, with a generally annular metallic electrode foot whose inner contour is adapted to the turbine-blade profile to be produced and whose outer contour is shaped for overlapping of each two consecutive forming operations at the blade-foot circle of the rotor being fabricated. According to another feature of our invention, we give the electrode foot a cylindrically curved working face whose radius corresponds to the radius of the blade-foot circle. According to still another feature of our invention, we further provide the electrode foot with the rounded inner edge adjacent to its working surface.

The rounding of the inner edge is such that, when the electrode is fully sunk into the rotor workpiece there will result the merging curvature desired at the foot of each blade. The outer contour of the generally annular electrode foot should be wide enough to have the above-mentioned overlapping come about slightly before the working face of the electrode reaches the foot circle of the rotor. Under such conditions the electrochemically not dissolved wedge of material between the individual blades becomes fully separated from the remaining body of the rotor. Furthermore, the cylindrical curvature of the working face should be in accordance with the shaft diameter (foot-circle diameter) of the rotor, the center of gravity position and the angular setting and the arcuate length of the blade, so that the electrochemically formed surface resulting from the sinking of the electrode into the workpiece will precisely corresponding to the cylindrical shape of the rotor along the foot circle.

The invention will be further described with reference to the accompanying drawing in which FIGS. 1 to 4 are explanatory, relating generally to tool electrode devices of the type improved by the invention; and FIGS. 5 to 11 relate to the invention proper. More specifically:

Figure 1:
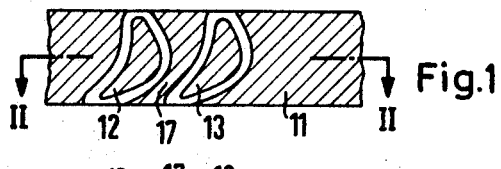
FIG. 1 is a schematic and partial plan view of a blade ring appertaining to a multi-stage turbine rotor, the adjacent stages not being illustrated, the view of FIG. 1 being in section along the line I—I in FIG. 2.
Figure 2:
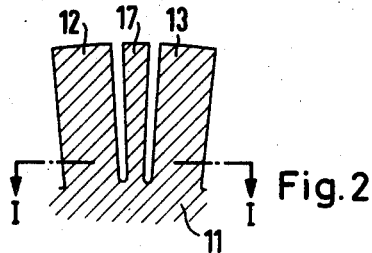
FIG. 2 is a section along the line II—II in FIG. 1, both FIGS. 1 and 2 showing the blade circle at the end of the electrochemical sinking operation, but prior to completion of the turbine rotor.
Figure 3:
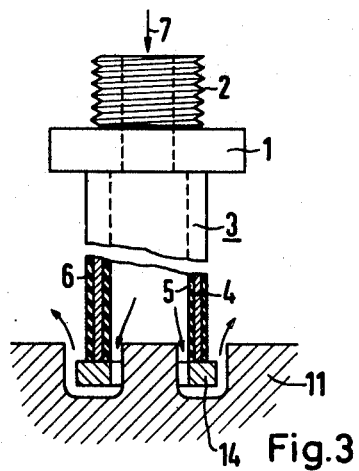
FIG. 3 is a lateral elevation, shown partly in section, of a tool electrode shown during a sinking operation.
Figure 4:
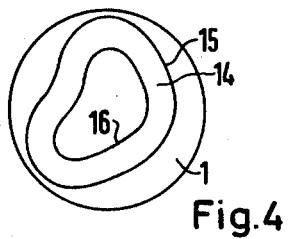
FIG. 4 is a bottom view of the tool electrode according to FIG. 3.

A blade ring shown in FIGS. 1 and 2 comprises a massive wheel body or shaft portion 11 with turbine blades 12 and 13 formed electrochemically as integral parts of the same workpiece. It will be understood that the workpiece originally employed for the electrochemical machining operation is a cylindrical rotor produced conventionally by mechanical machining. The blades are formed by electrolytic sinking operations with the aid of an electrode device of known design such as shown in FIGS. 3 and 4. The electrode device comprises a mounting flange 1 with a threaded portion 2, and a tubular shank 3 whose axis extends in the tool feed direction and which forms an inlet duct for supplying electrolyte during the operation of the device. The shank 3 is essentially formed by a metallic tube 4 covered on the inner surface by an insulating layer 5 and similarly insulated on its outer peripheral surface at 6. Mounted at the active end of the tube 4 and conductively joined therewith is an electrode foot 14 which has a planar base surface contoured in accordance with the shape of the blade to be produced. The outer contour of the electrode foot is denoted by 15 and the inner contour by 16. FIG. 3 shows how during the operation of the tool a flow of aqueous electrolyte is forced through the tubular shank against a workpiece, this being indicated by an arrow 7. The electrode device is connected anodically and the workpiece 11 cathodically. The electrolyte forced against the workpiece and passing through the narrow working gap between the electrode foot and the workpiece is effective under the action of the electric current to dissolve material from the workpiece and to thus form or "machine" an annular cavity into the workpiece. As the material is being removed, the electrode device is advanced toward the workpiece at the rate of removal, thus electrochemically cutting into the workpiece in such a manner as to form a turbine blade in accordance with the inner contour of the electrode foot 14.

As will be seen from FIGS. 1 and 2 the use of such an electrode device leaves between the sequentially produced blades 12 and 13 a wedge-shaped portion of material 17 which is subsequently removed mechanically.

Figure 5:
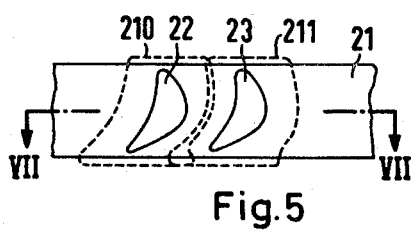
FIG. 5 is a schematic plan view of a single blade wheel or ring with an indication of overlapping sinking operations as performed with electrode devices according to the invention.
Figure 6:
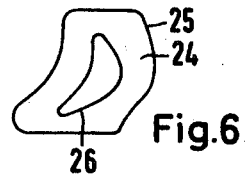
FIG. 6 is a view on to the active surface of an electrode foot employed according to the invention for obtaining an overlapping sinking operation as represented in FIG. 5.
Figure 7:
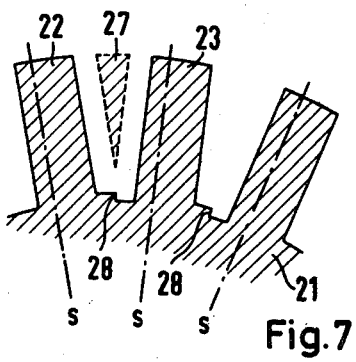
FIG. 7 is a cross section along the line VII—VII in FIG. 5.

In contrast thereto, the electrode device according to the invention, applied in the same manner to the successive forming of adjacent blades, results in an overlapping forming operation as represented in FIGS. 5 and 7. The electrode device employed for this purpose is similar to that of FIG. 3 except that the electrode foot shown at 24 in FIG. 6 is given an outer contour 25 of greater width in the peripheral direction of the rotor workpiece, the inner contour 26 remaining shaped in accordance with the profile of the individual turbine blade to be produced. Denoted by 21 in FIGS. 5 and 7 is the massive wheel or shaft portion of the rotor.

The blades 22 and 23 produced by repeated sinking operations with the aid of an electrode device according to the invention become completely separated from each other. The broken lines 210 and 211 in FIG. 5 indicate the overlapping occurring in the space between each two adjacent blades 22 and 23. Such overlapping takes place shortly before the electrode device is completely sunk into the workpiece and has almost reached the desired blade-foot circle of the workpiece. The wedge-shaped portion of material 27 remaining between the blades 22 and 23 is thus fully severed from the workpiece before the desired sinking depth is reached.

Figure 8:
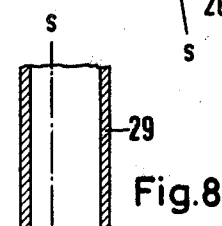
FIG. 8 is an axial section through a tool electrode device according to the invention equipped with an electrode foot according to FIG. 6 for use in sinking operations according to FIGS. 5 and 7, the surface insulation and mounting components of the electrode device being omitted in FIG. 8 since these are identical with those shown in FIG. 3.

The blade foot 24 shown in FIG. 6 is attached to the shank of the electrode device otherwise corresponding to FIG. 3, this shank being denoted by 29 in FIG. 8 in which the insulating coatings on the inner and outer surfaces of the shank are omitted. The gravity-center line of each blade is denoted by S in FIG. 7, and the corresponding gravity line is also denoted by S in FIG. 8. Due to the off-center position of the gravity line S, the use of an electrode with a planar foot surface as shown in FIG. 8 has the consequence that a stepped configuration will appear at 28 along the foot circle of the blades.

Figure 9:
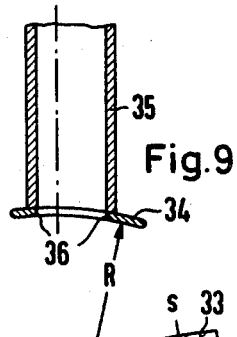
FIG. 9 is an axial section through another electrode device according to the invention.
Figure 10:
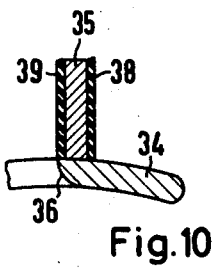
FIG. 10 shows more in detail a portion of the device according to FIG. 9.

According to a preferred feature of the invention, therefore, the working surface of the electrode foot is given a cylindrically curved configuration. In FIG. 9 and the more detailed illustration of FIG. 10, the shank is denoted by 35 and the electrode foot by 34. The electrode foot corresponds to FIG. 6 but has a cylindrical working surface coordinated to the gravity-center line S, the angular position of the blade relative to the diametrical plane of the blade ring and the chord length of the blade profile. The diameter R of the curvature is substantially equal to the diameter R of the foot circle indicated in FIG. 11. FIG. 10 shows that in an electrode device according to FIG. 9, the shank 35 is covered on the inner side and outer side by respective insulated layers 38 and 39. The inner edge of the electrode-foot contour is rounded at 36.

Figure 11:
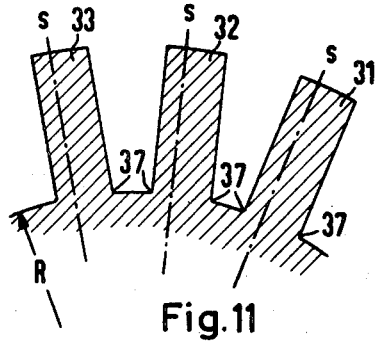
FIG. 11 is a cross section corresponding to FIG. 7 but showing the improved performance of an electrode device according to FIGS. 9 and 10.

By employing an electrode device according to FIGS. 9 and 10, the workpiece rotor is formed as shown in FIG. 11. It will be seen that the blades 31, 32 and 33 join the remaining of the workpiece along the foot circle, the cylindrical intermediate surface portions being no longer stepped. By virtue of the rounding at 36, the blades become correspondingly rounded where their foot meets with the blade circle at 37.

It will be recognized that the arcuate or angular distance between the gravity lines S in FIGS. 7 or 11 corresponds to the arcuate or angular blade division of the rotor. A comparison with FIG. 5 will show that the width of the electrode foot 24 (FIG. 6), in order to produce the overlapping schematically shown in FIG. 5 must be larger along the foot circle than the corresponding arcuate blade division of the rotor, this division corresponding along the foot circle to the arcuate distance between two sequential gravity lines S.

Upon a study of this disclosure it will be apparent to those skilled in the art that our invention permits of various modifications with respect to the shape and relative dimensions of the electrode devices and hence may be given embodiments other than those particularly illustrated and described herein, without departing from the essential features of our invention and within the scope of the claims annexed hereto.

We claim:

1. An electrode device for electrochemically forming turbine rotors having a plurality of turbine blades, comprising a generally tubular metallic electrode shank insulated on its internal and external surfaces, a generally annular metallic electrode foot conductively joined with said metallic shank at one end of the latter, said annular electrode foot having an inner contour adapted to the workpiece profile to be formed and an outer contour unsymmetrical with respect to said inner contour, said annular electrode foot extending outwardly from said shank a distance larger than the wall thickness of said tubular shank to effect overlapping of each two consecutive forming operations, and said electrode foot having a concave working surface facing away from said shank, and said working surface having a curvature corresponding to the cylindrical shape of the rotor along the foot circle of the blades.

2. In an electrode device according to claim 1, said electrode foot protruding at one side of said shank a distance larger than at the opposite side.

3. In an electrode device according to claim 1, said electrode foot having a rounded inner edge adjacent to said working surface, whereby a corresponding rounding is produced on the workpiece.

4. An electrode device for electrochemically forming multi-stage turbine rotors, comprising a generally tubular metallic electrode shank insulated on its internal and external surfaces, a generally annular metallic electrode foot conductively joined with said metallic shank at one end of the latter and having an inner contour adapted to the workpiece profile to be formed, said annular electrode foot having a working surface facing away from said shank and protruding laterally from said shank a distance which in the peripheral direction of said working surface is larger on one side than on the opposite side of said shank, and said electrode foot having a rounded inner edge adjacent to said working surface for producing a corresponding rounding on the workpiece, and said working surface having a curvature corresponding to the cylindrical shape of the rotor along the foot circle of the blades.

References Cited

UNITED STATES PATENTS

| 3,218,248 | 11/1965 | Williams | 204—284 |
| 3,293,166 | 12/1966 | Cowing | 204—224 |
| 3,383,296 | 5/1968 | Trager | 204—143 M |
| 3,421,997 | 1/1969 | Williams | 204—284 |
| 3,485,744 | 12/1969 | Schaffner | 204—224 X |
| 3,489,671 | 1/1970 | Stark et al. | 204—284 |

FOREIGN PATENTS

| 1,290,734 | 1962 | France | 204—143 M |
| 198,871 | 8/1967 | U.S.S.R. | 204—143 M |
| 1,014,095 | 12/1965 | Great Britain | 204—143 M |

JOHN H. MACK, Primary Examiner

R. J. FAY, Assistant Examiner

U.S. Cl. X.R.

204—143 M, 224 M